Figure 9:
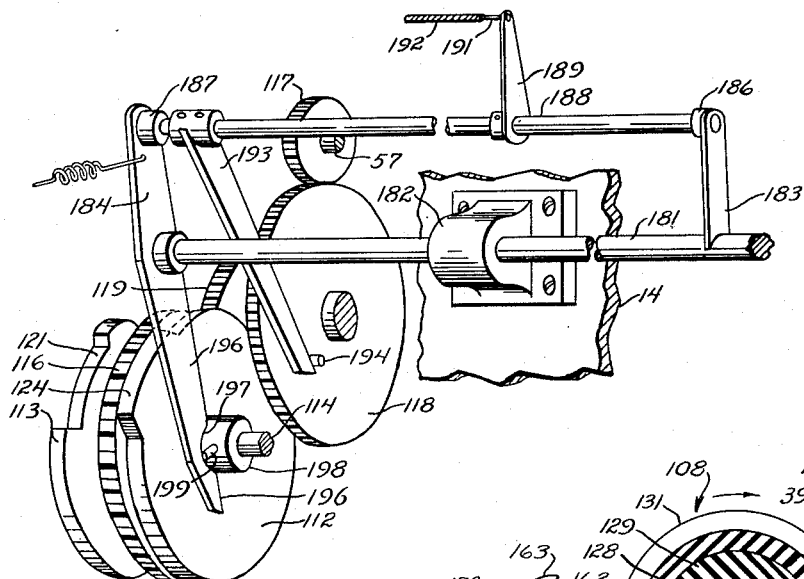

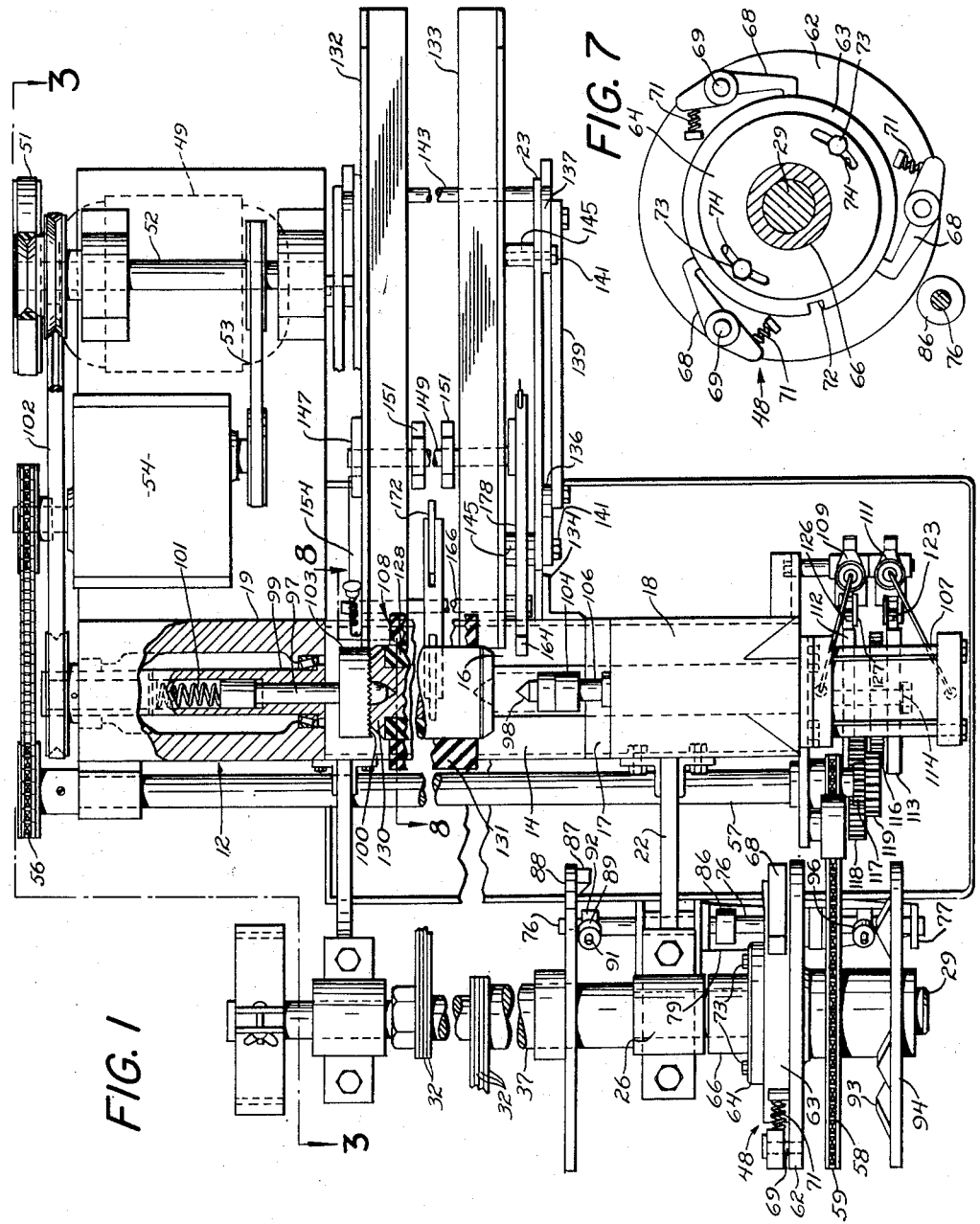

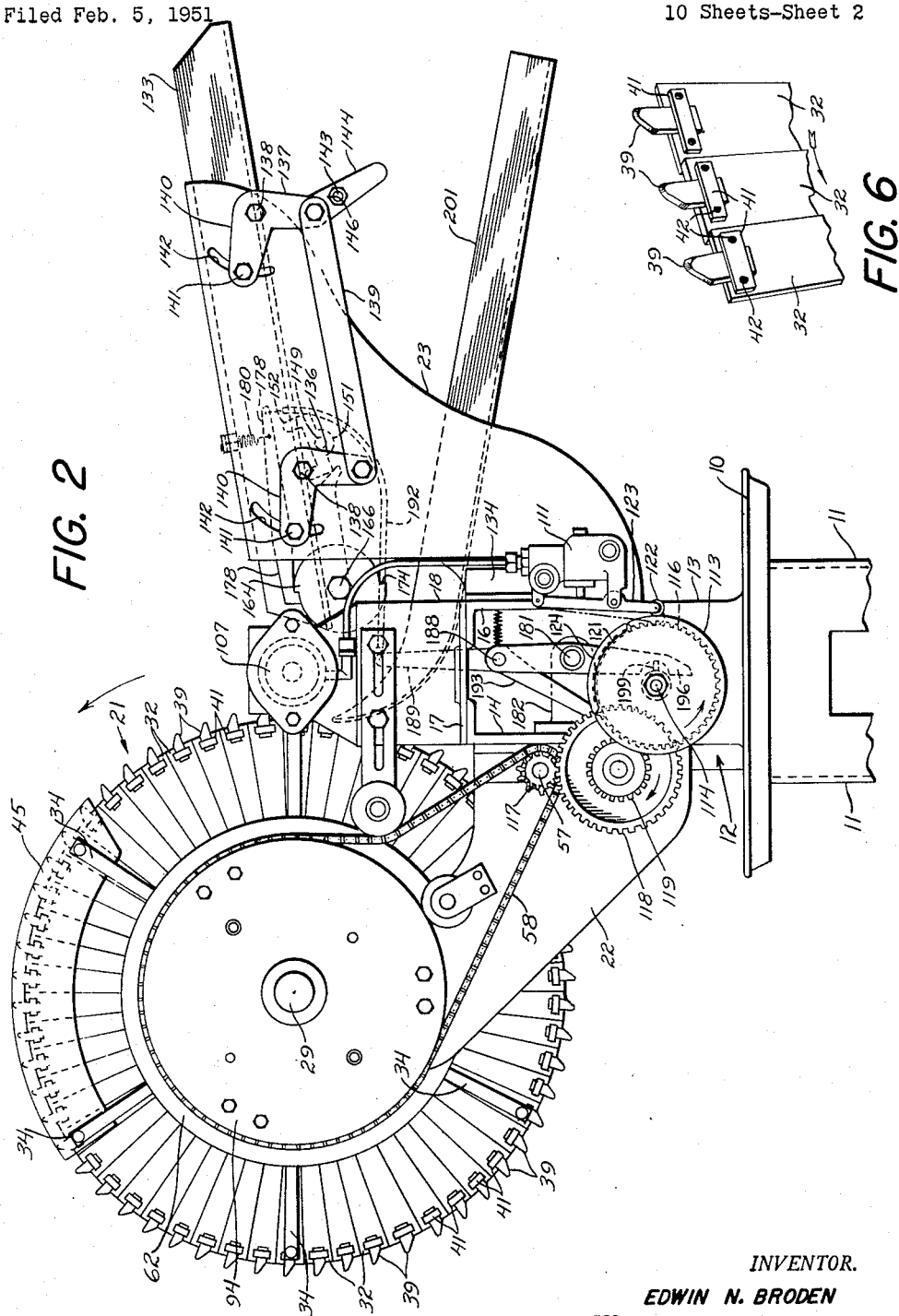

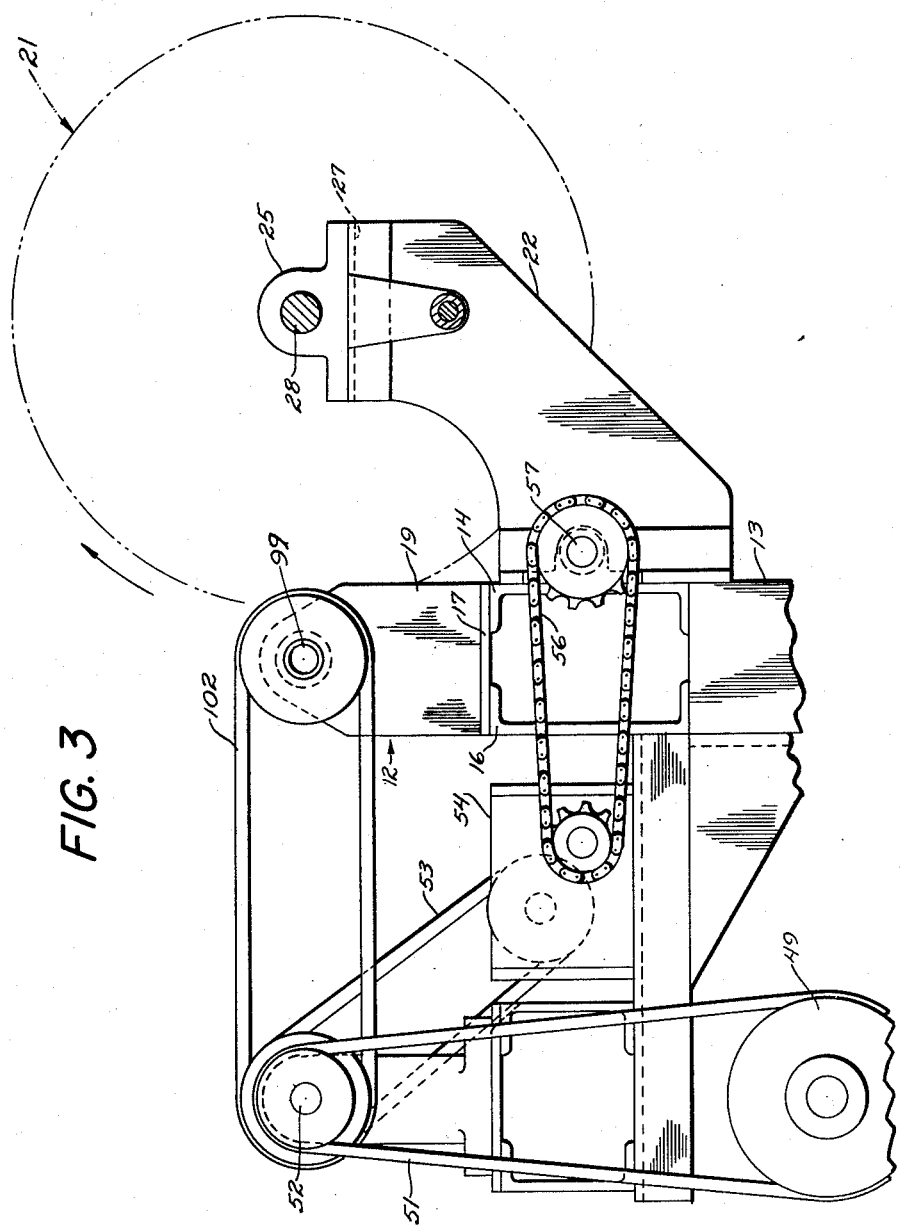

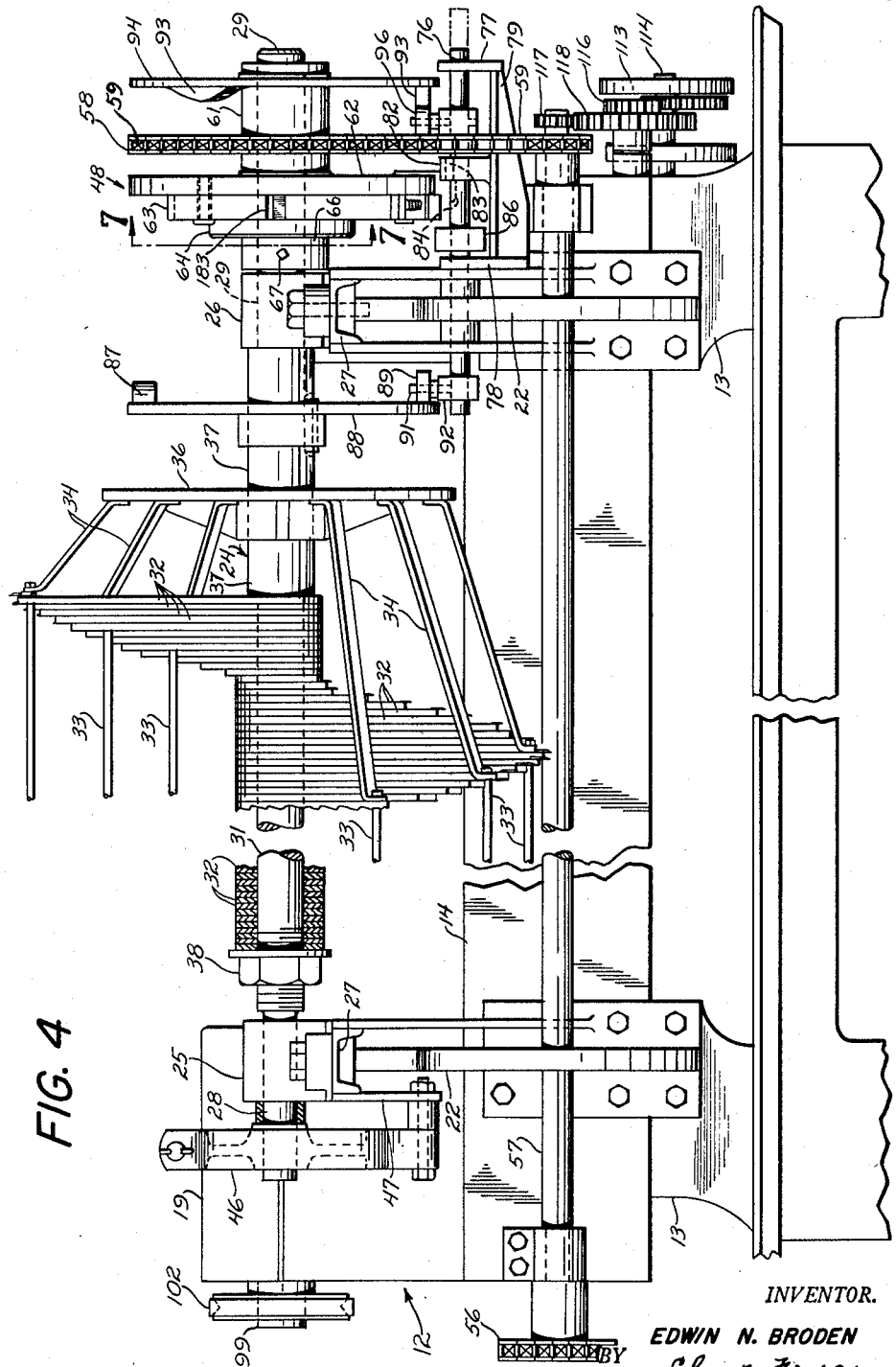

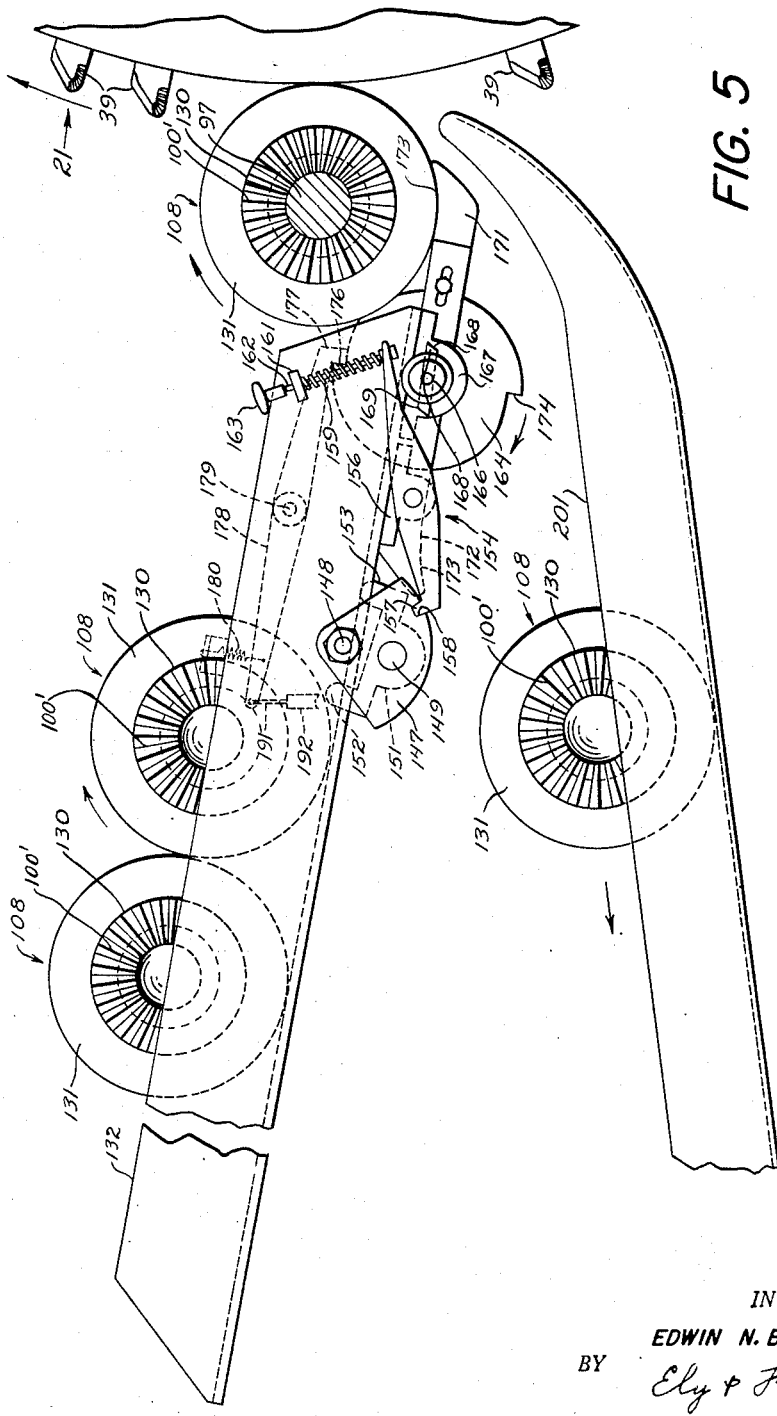

Dec. 14, 1954    E. N. BRODEN    2,696,883
CUTTING MACHINE
Filed Feb. 5, 1951    10 Sheets-Sheet 6

INVENTOR.
EDWIN N. BRODEN
BY
Ely & Frye
ATTORNEYS

Dec. 14, 1954   E. N. BRODEN   2,696,883
CUTTING MACHINE
Filed Feb. 5, 1951   10 Sheets-Sheet 7
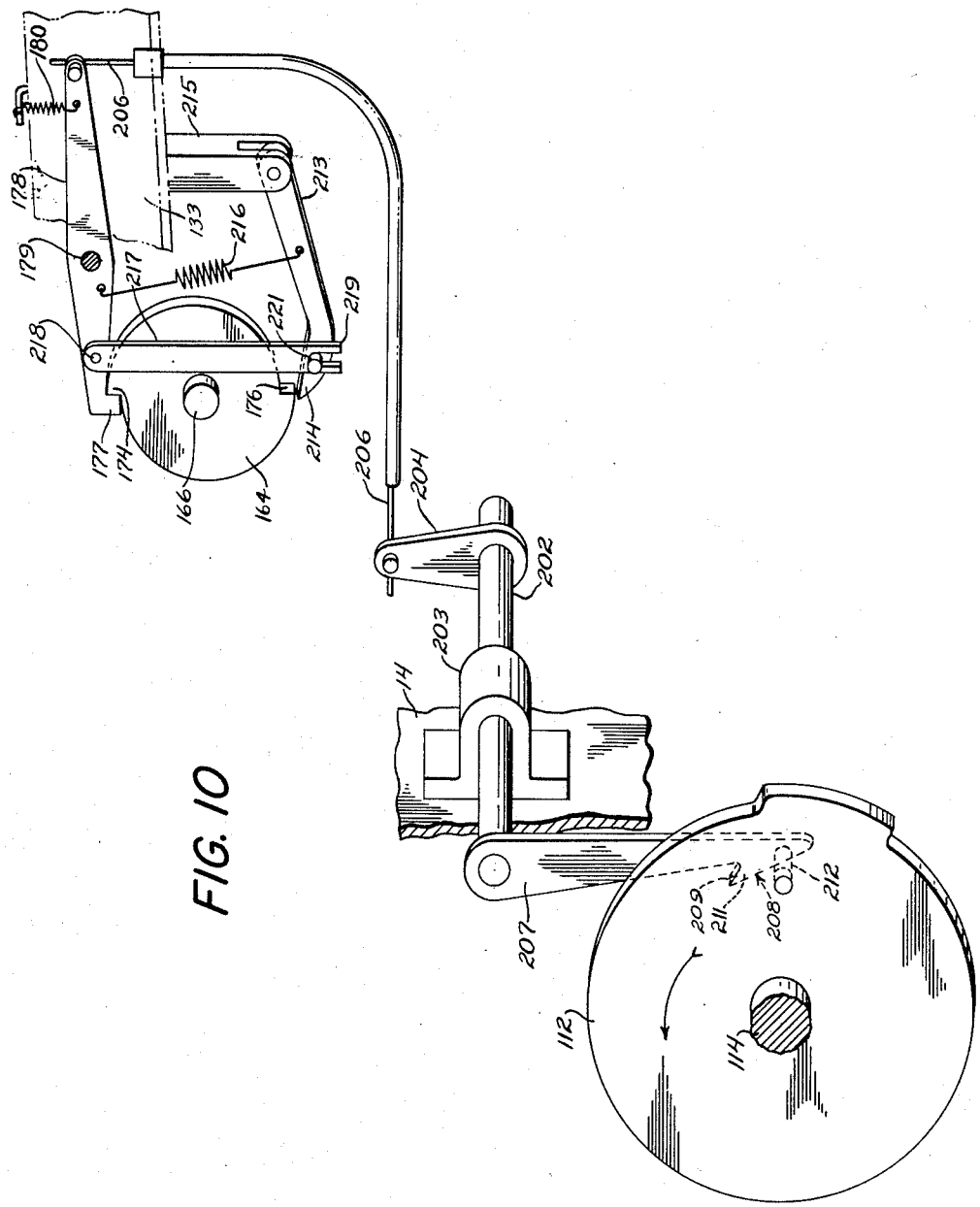
INVENTOR.
EDWIN N. BRODEN
BY Ely & Frye
ATTORNEYS

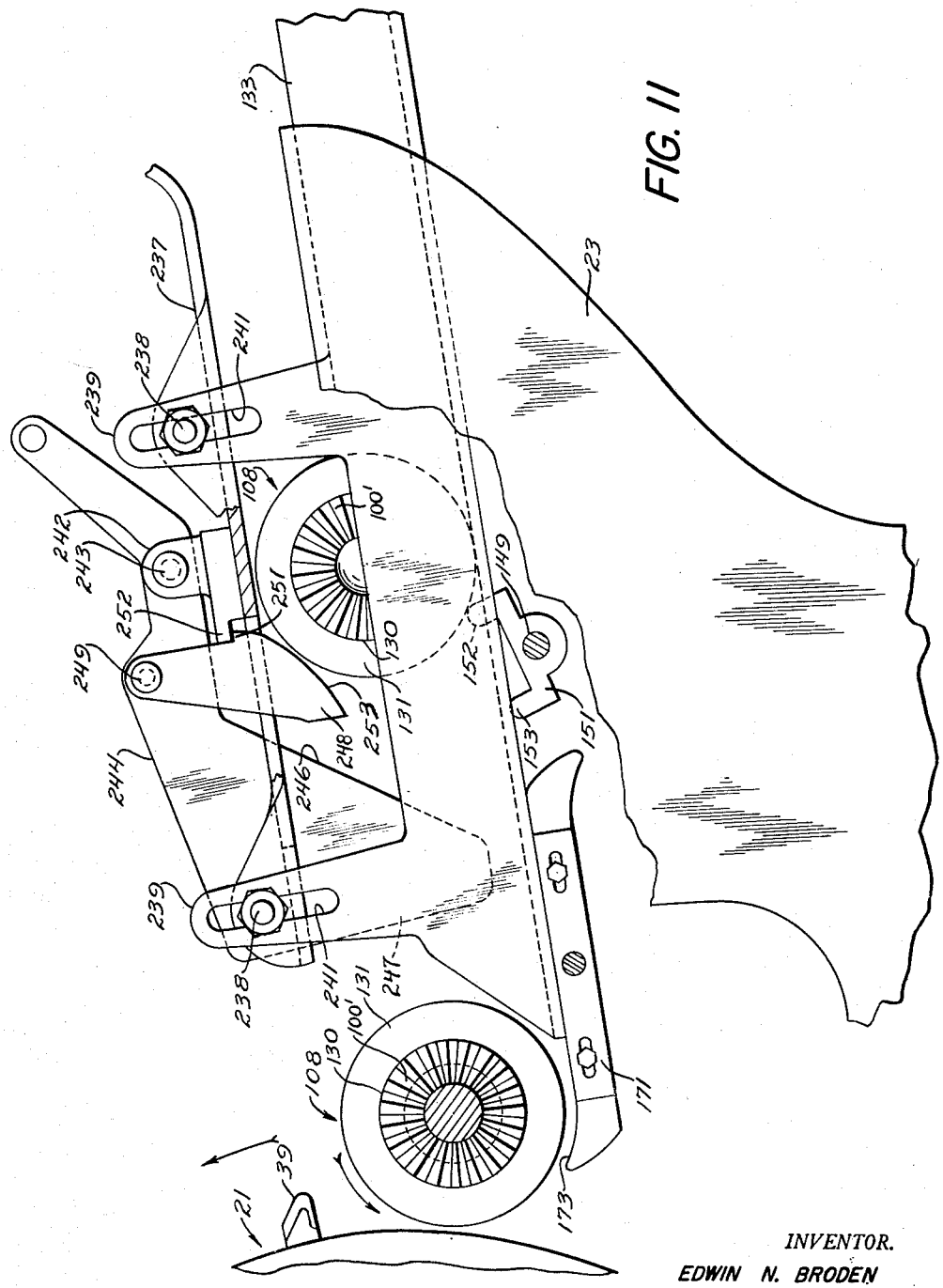

Dec. 14, 1954    E. N. BRODEN    2,696,883
CUTTING MACHINE

Filed Feb. 5, 1951    10 Sheets-Sheet 9

INVENTOR.
EDWIN N. BRODEN
BY Ely & Frye
ATTORNEYS

Dec. 14, 1954  E. N. BRODEN  2,696,883
CUTTING MACHINE
Filed Feb. 5, 1951  10 Sheets-Sheet 10

INVENTOR.
EDWIN N. BRODEN
BY *Ely + Frye*
ATTORNEYS

United States Patent Office 2,696,883
Patented Dec. 14, 1954

2,696,883

CUTTING MACHINE

Edwin N. Broden, Assonet, Mass., assignor to The Firestone Tire & Rubber Company, Akron, Ohio, a corporation of Ohio Application February 5, 1951, Serial No. 209,486

16 Claims. (Cl. 164—69)

This invention relates to a cutting machine and, in particular, to a rotary cutter adapted to slice a tube of rubber-like material into ring-form elements to provide gasket washers of the type used on friction-sealed fruit jars, and forms a continuation-in-part of my co-pending application, Serial No. 791,413, filed December 12, 1947, now abandoned.

Heretofore, such operations have been performed on machines employing knives which were moved radially into the work, then withdrawn and indexed to a new position defining the width of the piece to be cut, and the knife was again moved into the work. Obviously, this is unduly time-consuming and, as a matter of common knowledge, was not capable of producing an item within the close tolerances demanded by the consumer industries. Yet, prior to the invention of the present machine, such machine was the best available. Gang knives have been tried in this "radial-advance" type of machine in the hope of speeding production, but these have not produced acceptable items.

I have found that by employing knives on a rotating shaft with the knife edges arranged in a helical pattern, and rotating the work in the same direction as that of the drum, the output is multiplied over what has been possible heretofore and precision of cutting is enhanced to a degree wherein practically the total output is within the tolerances of size and quality demanded.

It is, therefore, a principal object of the invention to increase the rate of production of resilient, ring-form articles, a further object being to provide increased production while improving the quality of output. More specifically, it is an object to provide a machine for cutting ring-shaped articles which effects a plurality of cuts simultaneously on a single work piece, the cuts having accurate surfaces, and the dimensions of the cut pieces being held to close tolerance.

Other objects are to cut ring-shaped articles from a tube without the necessity of reciprocating the cutter; to provide rotary knives in conjunction with a rotating mandrel; to effect adjacent cuts wtihout the need for indexing, thus providing for smooth continuity between the engagement of knives for adjacent cuts; and to provide a cutting machine for ring-shaped articles having a separate knife for each cut.

In general, it is an object to provide the foregoing in a machine which is continuous in operation and completely automatic except for placement and removal of work pieces.

Figure 8:
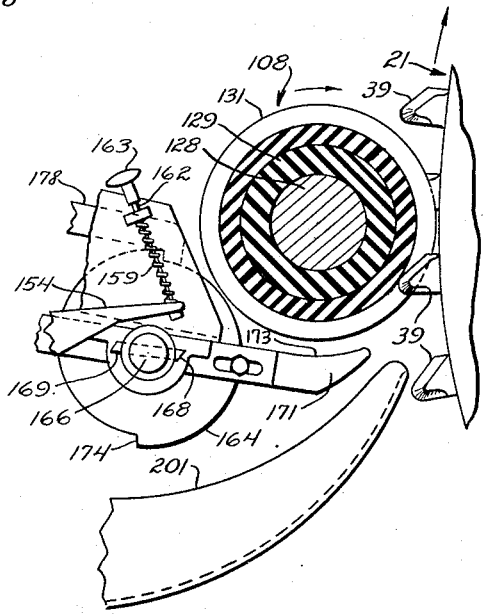
Figure 12:
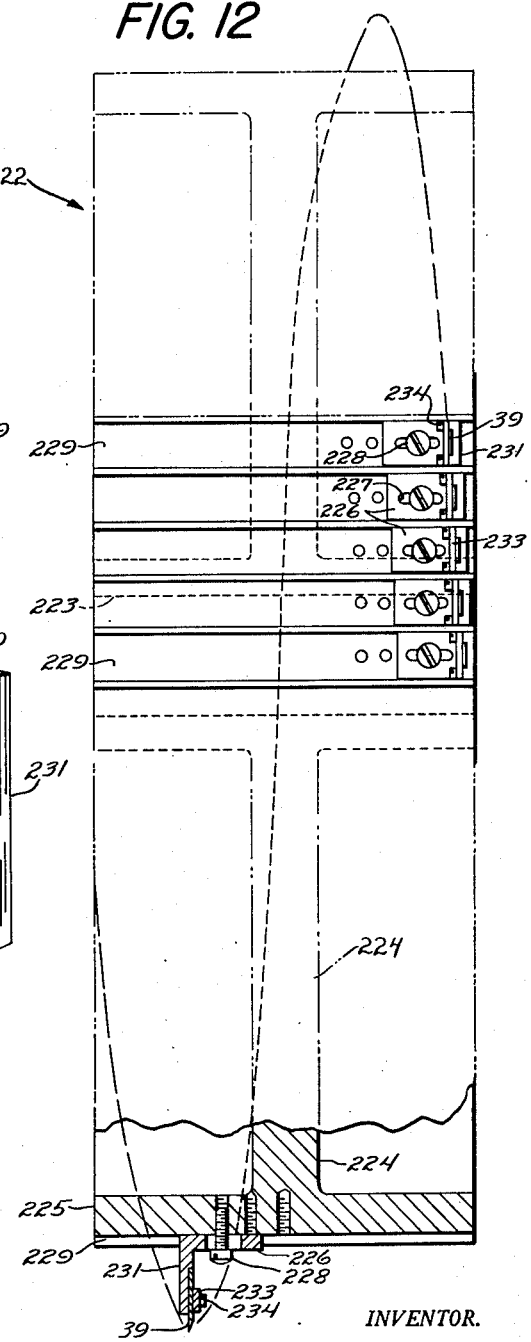
Figure 13:
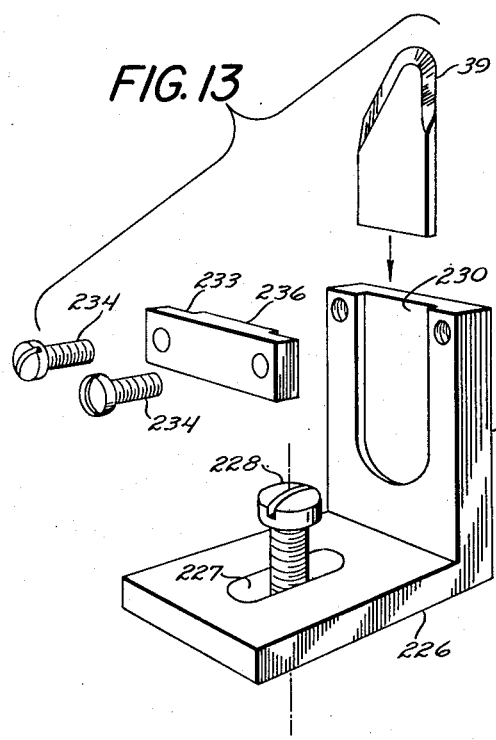
Figure 14:
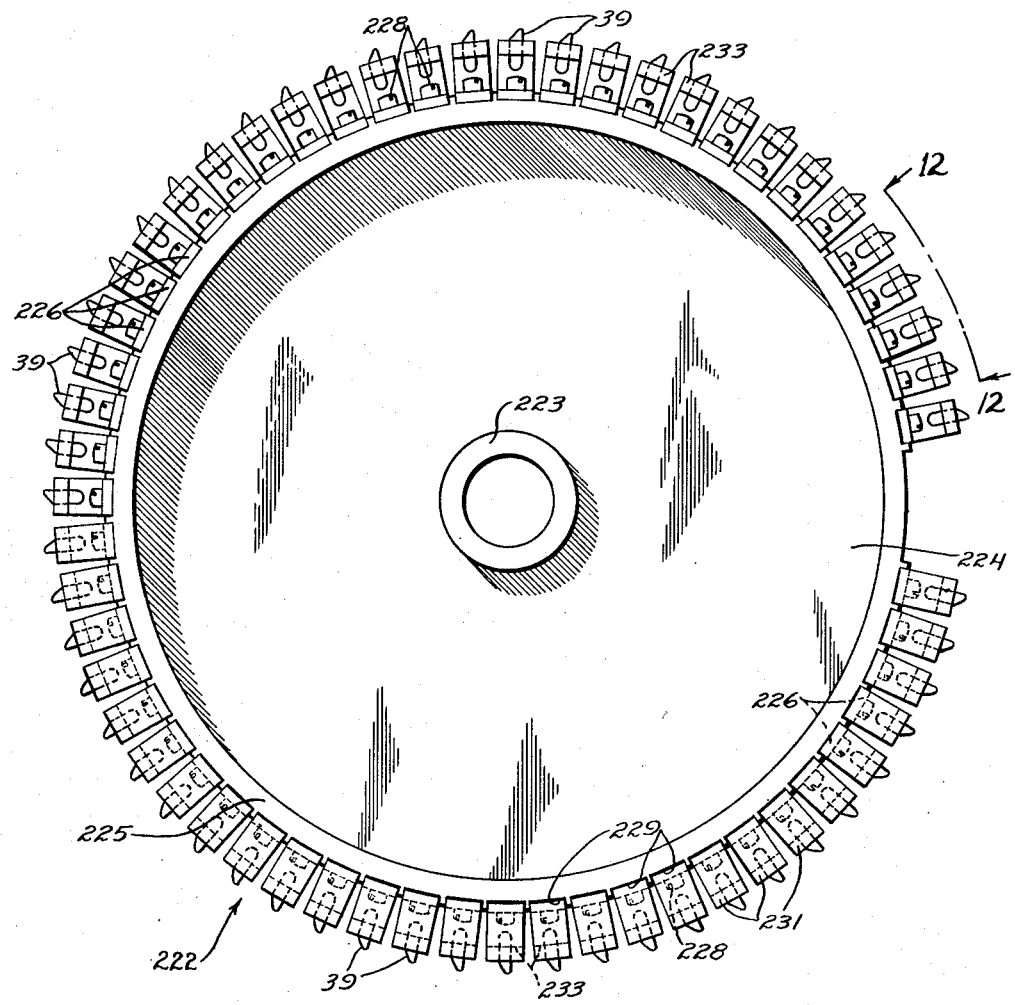

These and other ends are attained by the invention, preferred forms of which are described in the accompanying specification and illustrated in the drawings, in which:

Fig. 1 is a top plan view of the machine, broken centrally for foreshortening, and with certain parts broken away, Fig. 2 is an end elevational view of the machine, as seen from the bottom of Fig. 1, Fig. 3 an end elevational view of the machine, as seen from the top of Fig. 1, showing only the drive system, as seen on line 3—3 of Fig. 1, Fig. 4 is a rear elevational view of Fig. 1, as seen from the left of Fig. 1, Fig. 5 is an enlarged, fragmentary view in elevation of the feed system (located immediately behind the drive system shown in Fig. 3), Fig. 6 (adjacent Fig. 2) is an enlarged, fragmentary view of three of the knives on the cutting drum, Fig. 7 (adjacent Fig. 1) is a sectional view taken on the line 7—7 of Fig. 4, Fig. 8 is a section, partly through the mandrel in work position, and taken on the line 8—8 of Fig. 1, Fig. 9 is an enlarged view, in perspective, of parts of a trigger arrangement for an escapement mechanism, seen otherwise in elevation in the lower, central part of Fig. 2, Fig. 10 is an enlarged view, in perspective, of a modified escapement mechanism, Fig. 11 is an end elevational view, similar to a part of Fig. 2, showing certain additional structure, Fig. 12 is a front elevational view of a section of a modified cutting drum, with only a few of the cutting blades shown, and the drum partly broken away, Fig. 13 is an exploded view, in perspective, of the cutting blade holder assembly, and Fig. 14 is an end view of the drum section of Fig. 12.

Referring to the drawings by characters of reference, there is shown a machine mounted on a conventional table 10, having legs 11. Mounted at opposite ends of the table are standards, indicated generally by the numeral 12, on which all components of the machine are supported. Each standard comprises a base pedestal 13 on which are mounted two sections of channel 14, 16. Spanning the top flanges of the channels at each end of the machine is a plate 17, and on the latter are mounted bearing blocks 18, 19, respectively.

Bearing blocks 18, 19 provide journaled support for elements which hold the tube-covered mandrels in working position, as will be later described in detail. A cutting drum, indicated as a whole by the numeral 21, is supported on channel 14 by a pair of brackets 22. The feed tray assembly and other parts are supported on channels 16 by a pair of brackets 23.

As best seen in Fig. 4, the cutting drum is carried by a shaft 24 which is journaled in bearing blocks 25, 26, bolted to channels 27 carried by brackets 22. Shaft 24 carries a plurality of elements other than the cutting drum, and is formed in several sections of different diameters. The end sections 28, 29 of the shaft, received in the bearing blocks 25, 26, have the minimum diameter. A section 31 of the shaft adjacent end 28 has a diameter somewhat greater than the latter and carries the cutter drum fingers 32. The said fingers are mounted on the shaft, in keyed relation thereto, and are arranged fanwise so that their outer ends define a helical path. A series of tie rods 33, passing through some of the fingers near their outer ends and arranged parallel to shaft 24, lend rigidity to the assembly, and further rigidity is attained by slant braces 34, connecting end fingers with a ring member 36 keyed to a section 37 of shaft 24. The fingers 32 are jammed together by a nut 38, threaded on the outer end of shaft section 31 and urging the helix as a whole against the shoulder formed by shaft section 37.

Mounted on the outer ends of fingers 32 are the cutter blades 39 (Fig. 6), which are secured by clamp bars 41 held by screws 42. The blades are thus radially and circumferentially adjustable in position. Each blade has a singly beveled cutting edge and this edge is slanted on its leading edge. A cutter blade 45 is provided at each end of the helix to trim the ends of the tube.

As will be presently described, the drum stops once in each revolution, for removal and replacement of work pieces, and, in order to minimize coasting, a constantly acting brake 46 of any convenient structure is provided on shaft 24, being bolted to a bracket 47 secured to channel 27.

Intermittent operation of the drum is accomplished by means of a clutch mechanism mounted on end section 29 of shaft 24, and indicated as a whole by the numeral 48. The drive to the drum is communicated from a motor 49 (Fig. 3), which also provides power for rotating the work-piece and certain controls to be later described. A belt 51 at the motor transmits rotation to a countershaft 52 from whence the drive is carried separately to the cutting drum and to the work piece, the latter being rotated rapidly, and the former being rotated at a relatively slow rate. The separate drives enable adjustment of the speed ratio between these two elements.

The drive from countershaft 52 to the cutting drum is arranged in three stages. A belt 53 operates the input of a reduction gearing system 54, and a chain 56 communicates between the output of the latter and a countershaft 57, which extends across the entire length of the machine. On the end of the machine opposite from motor 49, a chain 58 (Figs. 2 and 4) communicates rotation from countershaft 57 to clutch 48 through a sprocket 59, having a hub 61 rotatable on section 29 of shaft 24 and including an integral disc 62 forming a disconnectible part of clutch 48. The cooperating part of clutch 48 comprises a disc 63 secured to a flange 64 of a collar 66, which latter is secured by a set screw 67 to section 29 of shaft 24 so as to be rotatable therewith. Thus, when the clutch sections 62 and 63 are connected, chain 58 drives shaft 24 to rotate drum 21.

As best seen in Fig. 7, the clutch parts may be connected by any one of a series of pawls 68, pivotally carried on pins 69 threaded in disc 62, which pawls are urged by springs 71 against disc 63 and by this means forced into slot 72 in the latter when brought into alignment therewith by rotation of sprocket 59. Discs 63 and 64 move in unison, being connected by bolts 73, and the angular position of slot 72 relative to drum 21 is adjustable throughout the length of arcuate slots 74 through which bolts 73 pass.

It will be seen that as long as one of the lugs 68 is engaged in slot 72, the drum will be rotated. However, once in each revolution of the drum it becomes necessary to stop the drum for a brief interval to permit removal of the cut work and placement of a new workpiece, following which it is desired that the drum resume its rotation automatically. This is accomplished by cam means as follows: A rod 76 is mounted for sliding reciprocation through the uprights 77, 78 of a bracket 79 secured to a plate 81, depending from channel 27 and to the base of bracket 22. A central bearing block 82 supported on bracket 79 has a key 83 cooperating with a keyway 84 in rod 76 whereby the rod is prevented at all times from rotating about its axis. Fixed to rod 76 is a roller form element or toe 86, which moves with rod 76 into the path of lugs 68 to contact the outer ends thereof and thus lift their inner ends out of slot 72 against the pressure of springs 71.

Toe 86 is moved to the right to disconnect the clutch by means of a cam lobe 87, carried by a disc 88 keyed to shaft 24, which engages a cam follower roller 89 journaled on a pin 91 threaded in a block 92 fixed to rod 76. Movement of toe 86 to the left, to permit automatic connection of the clutch parts, is accomplished by any one of three cam lobes 93, mounted in spaced relation near the periphery of a disc 94 secured to hub 61 of the sprocket 59, which lobes are adapted to contact a cam roller 96 mounted on slide rod 76 in a manner similar to roller 89.

As seen in Fig. 5, a portion of the periphery of the cutting drum, extending throughout its length, is free of cutting blades 39. It is when this clear region is adjacent the work piece that rotation of the drum is interrupted, so that the cut piece may fall away from the cutter and a fresh work piece be introduced, without interference from the blades. Thus cam lobe 87 is so positioned that when the final blades of the several pitches of the helix have operated simultaneously on the work piece, cam roller 89 is contacted to move slide rod 76 to the dotted line position shown at its right end in Fig. 4, bringing toe 86 into the path of revolution of lugs 68. Slot 72 bears a fixed angular relation to cam lobe 87, and the arrangement is such that toe 86 always moves into the path of revolution of the lugs in front of the lug which is engaged in the slot 72. Upon continued rotation of the system, this lug contacts toe 86 and is lifted out of the slot, and disengagement of the clutch results. In this movement of the slide rod, cam roller 96 is carried into the path of revolution of cam lobes 93, these being staggered with relation to lugs 68. The clutch remains disengaged until cam roller 96 is engaged by one of the lobes 93, and since lobe 87 has at this time moved past roller 89, the rod 76 is returned to its original position, permitting the lug which is approaching slot 72 to fall into said slot, re-engaging the clutch and resuming rotation of the cutting drum.

The time interval during which the drum is stopped may be varied by adjustment of the several parts (at arcuate slots 74 for instance), so that the time lost is no more than is necessary to effect change of the work pieces. The provision of three lugs and three cam lobes 93 is effective for minimizing this lost time, but it will be understood that the system could be operated using only one lug and one cam lobe 93.

The work holding arrangement

At the cutting station the work is held between a headstock center 97 (Fig. 1) and a tailstock center 98. The former is slidably mounted, in keyed relation, in a sleeve 99 which is journaled for rotation in bearing block 19. The inner end of center 97 abuts a compression spring 101, which provides a resilient backing for a reason presently to be explained. Sleeve 99 is rotated by a belt 102 connected to countershaft 52, and has a collar 103 near its outer end suitably constructed for engaging a work-holding mandrel in positive, driving relation, as by mating, radial serrations 100.

Tailstock center 98 is mounted for rotation in an antifriction bearing assembly 104 carried on the piston rod 106 of an air cylinder 107, the rod being slidably mounted in bearing block 18 and the cylinder being mounted on the outer face of this block. When cutting of a unit has been completed, center 98 is retracted by the cylinder through control means presently to be described, and the work piece, indicated as a whole by the numeral 108, is permitted to drop. Cylinder 107 is double-acting, and is controlled by two valves 109, 111 operated respectively by cams 112, 113, best seen in Figs. 1 and 2, and in enlarged detail in Fig. 9. The cams are keyed to a shaft 114, journaled in base pedestal 13, which shaft also carries, between the cams, a gear 116 which is driven from countershaft 57 by a chain of reducing gears 117, 118, 119.

Outer cam 113 has a radially reduced portion 121 in its periphery, extending for a short distance along its periphery. During rotation of drum 21, the outer periphery of cam 113 holds the roller 122 of an actuating lever 123 of valve 111 so that air pressure is held on the outward side of the piston in cylinder 107, thus urging center 98 against work piece 108.

Cam 112 has a configuration complementary to that of cam 113 with a maximum diameter over a short peripheral length at 124, angularly aligned with notch 121 of cam 113, and the balance of the cam being of a lesser radius. This cam operates a roller 126 on a lever 127, which controls valve 109. When hump 124 of cam 112 engages roller 126, roller 122 is released and pressure is placed on the inner side of the piston of cylinder 107 to withdraw center 98, permitting the work piece to drop. It should be borne in mind that shaft 114 is rotating continuously, whereas the cutting drum runs intermittently. For proper synchronization, the gear train 117, 118, 119, 116 and the length of slot 112 (and hump 124) are so designed that the longer peripheral regions of the cams are in contact with the rollers during cutting action of the blades, and the shorter peripheral regions define a time interval during which the drum is stopped.

The mandrels, on which the tubes to be cut are mounted, comprise a central metallic core 128, surrounded by a non-metallic buffer sleeve 129, which protects the ends of cutting blades 39. The core 128 has an end flange 130 with radial serrations 100' which mate with serrations 100 on the headstock center. The workpiece 131 of tubular form, and having an exaggerated thickness, as shown, is slipped around sleeve 129 in tight fitting relation. The operation of mounting tubes 131 and removing the cut washers is effected automatically by conventional machinery which need not be described herein.

The cutting action of the drum teeth is illustrated in Fig. 8, the directions of rotation of the drum and mandrel being in the same direction, so that the work moves against the approaching teeth. The cut proceeds in spiral fashion from the periphery of tube 131 (which is of exaggerated thickness as shown), to and through its inner wall; however, with the mandrel rotating three hundred times as fast as the drum, the practical effect is a cut, the bottom of which recedes in the form of a circle toward the axis of the mandrel. In Fig. 8, the cut portion of the tube is shown as a clear space, and the uncut portion is cross-hatched.

As stated above, there are a plurality of convolutions in the drum helix and, therefore, a plurality of series of rings are commenced simultaneously at spaced points along the length of the work piece. This not only speeds up the cutting operation, but permits using a drum of minimum diameter. It also stabilizes the tube during cutting and improves the quality and accuracy of the cut.

Another feature tending toward stabilization is the fact that after the first series of teeth have passed into the work, there are at all times two adjacent teeth engaged therein, which minimizes the effects of spreading of the work away from the blades.

Work piece assemblies 108 are fed by hand into an inclined ramp comprising a pair of rails 132, 133 of right angular section, spaced apart a distance slightly greater than the length of a mandrel 128. As will be shown, the units 108 are retained in the upper part of the ramp and automatically released one by one to the cutting station as required. The ramp rails are supported by brackets 23 connected by angle plates 134 to channels 16 of the supporting standards 12. As best seen in Fig. 2, the angle of the ramp may be varied to take care of work pieces of different diameter, by means of a parallel linkage comprising a pair of bell cranks 136, 137, pivoted at 138 to each of the brackets 23 and each pair being interconnected by a link 139. Since the linkages are the same at each side of the ramp, only one need by described. Arms 140 of the bell cranks carry bolts 141 passing through arcuate slots 142 in bracket 23 and threaded into bosses 145 on rail 133. It will be seen that rails 132, 133 may be raised or lowered by rotating the bell cranks about their pivots, and they will be held in adjusted position by clamping of arms 140 against the rails by bolts 141. For convenience in adjusting the rails, a cross rod 143 is provided, being held in extensions 144 of bellcranks 137 and secured by nuts 146.

Feeding and ejecting mechanism

The feeding and ejecting mechanism for the work pieces are interconnected and will therefore be described together.

The loaded mandrels on the rails 132, 133 are held from rolling into cutting position by means of an escapement mechanism mounted for rocking motion on the ramp. The escapement comprises identical structure on each side of the ramp except for the detent feature on the side shown in Fig. 5, and only this one side need be described. A plate 147 of sector form is supported, near its apex, on a bolt 148 carried by rail 132, whereby the plate is swingable about the axis of the bolt. The plate is secured to a cross rod 149 which is secured at its other end to a similar sector plate. Also secured to rod 149 is an escapement tooth element 151 having a pair of upstanding lugs 152, 153 positioned in spaced relation on either side of rod 149. A lever 154, medially pivoted on a bracket 156 secured to the underside of rail 132 has a latch 157 engageable in a notch 158 in plate 147 to hold the plate in the position shown in Fig. 5. This locked relation is normally maintained, that is to say, during the cutting operation, by means of a coil spring 159 acting between the other end of lever 154 and a lug 161 on rail 132. The spring is stabilized laterally by means of a rod 162 passing through lug 161, spring 159 and lever 154, being secured to the latter. As will be explained, the lever is moved automatically to release the escapement, but if desired this may be accomplished manually, a knob 163 being provided on rod 162 for this purpose.

In the positions of the parts as shown in Fig. 5, the foremost of the waiting work pieces 108 is restrained by lug 152 of the escapement. Upon withdrawal of latch 157, the weight of the work piece depresses lug 152 and commences to roll down the rails. This rocks plate 147 and raises lug 153 into the path of the work piece. The weight of the work piece thereupon depresses lug 153, again rocking plate 147 and bringing lug 152 into position to obstruct further downward movement of the next succeeding work piece. By this time, the mechanism which actuated lever 154 has returned to normal position and latch 157 is enabled to again enter notch 158. During this period, a finished work piece has dropped and the work piece released by the escapement has rolled into cutting position.

Actuation of lever 154 is accomplished by a second escapement mechanism comprising a disc 164 positioned outwardly of rail 132, and keyed to a shaft 166 journaled in bearing blocks 167 secured to the underside of the rails. Shaft 166, on the end shown in Fig. 5, carries, outwardly of rail 132, a pair of diametrically oppositely disposed cam lugs 168, 169, each adapted to contact the right end of lever 154 and move it sufficiently to remove latch 157 from notch 158.

Shaft 166 also carries, near each end, a pair of oppositely disposed fingers 171, 172, adapted to hold the work piece 108 at the drum, the fingers having a curved surface 173 for this purpose. The fingers hold the work piece prior to its pick-up by mandrel centers 97, 98, whereupon, due to the tapered ends of the latter, it is raised slightly so as to be free of the fingers for rotation, and when a finished work piece is released from the centers it urges the fingers downward to rotate shaft 166 and release latch 157.

Disc 164 has a pair of diametrically, oppositely disposed shoulders 174, 176 which contact a latch 177 on a lever 178, which is pivoted intermediate its length at 179 to the far rail 133. Lever 178 is biased to a position locking disc 164 against rotation by means of a spring 180, and latch 177 is lifted to release the disc for rotation by means of a third escapement mechanism presently to be described. Latch 177 is lifted only momentarily, as it must drop back into contact with the periphery of disc 164 before one-half revolution of the latter occurs, and the disc is stopped by contact of the latch with the opposite shoulder, which will be shoulder 174 in Fig. 5.

The mechanism comprising the third escapement is shown in enlarged detail in Fig. 9. A main rocker shaft 181 is journaled in a horizontal bearing block 182 bolted to back channel 14 of the standards. Secured to shaft 181 is an upright arm 183 at one end, and an arm 184 at the other end, the arms carrying respective bushings 186, 187 in which is journaled a shaft 188. The latter thus rocks as a whole about the axis of shaft 181 and is rockable about its own axis. Fixed to shaft 188 is an arm 189 to which is attached a control wire 191 leading through a suitable guide cable 192, the other end of the wire being attached to lever 178, as seen in Fig. 5. Thus a pull on wire 191 by swinging movement of arm 189 releases latch 177.

Shaft 188 also has secured thereto a downwardly depending arm 193 positioned for contact near its lower end by a pin 194 carried on gear 118 of the timer gear train controlling axial movement of the mandrel centers. Gear 118 is selected for this function because a quickacting release and return are needed for limiting disc 164 to one-half of a revolution, as explained above, and gear 118 rotates twice as fast as gear 116. However, since operation of the escapement is desired only once for each revolution of shaft 114 of the timer cams, means are provided for operation of lever 193 only once in two revolutions of gear 118. This is accomplished by keeping lever 193 normally out of the path of pin 194 and moving it into such path once during each revolution of shaft 114. Thus, arm 184 has a downward extension 196 with an arcuate groove 197 mating with the periphery of a collar 198 carried by shaft 114. When the groove and collar are in nested relation, shaft 181 assumes an angular position such that lever 193 is not contacted by pin 194. However, collar 198 carries a pin 199 which engages groove 197 and rocks shaft 181 in a clockwise direction, as viewed in Fig. 9, bringing arm 193 into the path of pin 194 so that shaft 188 will be rocked by that pin.

The action of the entire escapement mechanism is summarized as follows. When timer shaft 114 reaches a position where the mandrel is released, pins 194 and 199 are in the same angular position, lever 193 is tripped, to rock the shaft 188, pulling wire 191 to turn lever 178 and lift latch 177. The weight of the mandrel, which has fallen onto fingers 171 upon withdrawal of the tailstock center 98, causes shaft 166 to rotate, bringing cam lug 168 into contact with lever 154, rocking the same to withdraw latch 157 from notch 158, permitting plate 147 to be rocked by the weight of work piece 108, as described above. The action is momentary throughout the cycle, and all escapement parts quickly resume locked position.

Summary of operation

With a loaded mandrel held between centers 97, 98 and a supply of work pieces standing on rails 132, 133, the cutting is commenced. When the last series of cutting blades have cleared the work, leaving the bladeless portion of the drum adjacent thereto, cam lobe 87 contacts roller 89, moving rod 76 and bringing toe 86 into the path of pawls 68, whereupon the pawl which is engaged in slot 72 of the clutch plate 63 is lifted out, thus stopping the drum which is connected to plate 63. The clutch part 62 continues to rotate, carrying the pawls, but slot 72 remains adjacent toe 86, so that pawls 68 continue to ride by the slot, and the drum remains stationary.

Parts 121 and 124 of the timer cams then actuate the valve levers 123, 127 to retract tailstock center 98, releasing the mandrel bearing the cut rings or gasket washers. At about the same time, the escapement mechanism operates as above described, with the finished work falling into an inclined pan 201. The escapement permits the next following work piece 108 to move down into cutting position, supported on fingers 172, which have been brought into position by the half-revolution of shaft 166. At this time, the timer shaft 114 has moved sufficiently for the valve levers to move off cam parts 121, 124 and tailstock center 98 moves into contact with the mandrel which moves against spring-pressed headstock center 97 and is lifted by the conical ends of the center up out of contact with fingers 172. Thereafter, one of the cam lobes 93 returns rod 76 moving cylinder 86 out of the path of pawls 68, which are thereupon free to enter slot 72 and thus again start rotation of the drum.

A modified form of escapement between the timer cams and shaft 166 is shown in Fig. 10, where the quick release features are such that triggering may be taken directly from the slower, timer shaft 114. A rock shaft 202, mounted in a bearing block 203, similar to bearing block 182, has attached thereto an arm 204, to which is secured the end of a pull wire 206, similar to wire 191. Also attached to shaft 202 is a depending arm 207, having a barbed end 208 with a re-entrant shoulder 209. Arm 207 lies inside cam disc 112, and the slant face 211 of its barbed end is positioned to be contacted by a pin 212 extending from the inner face of disc 112. Slant face 211 provides a gradual rocking of shaft 202 to pull the wire 206, and shoulder 209 provides for a quick return of the rocking parts to normal position. Speedy restoration of normal conditions in the escapement at shaft 166 is also provided for in a manner now to be explained.

Lever 178 and disc 164 are the same as in the escapement originally described. However, in the present arrangement they are associated with an auxiliary detent lever which prevents rotation of disc 164 beyond 180° until such time as return of pull wire 206 permits re-engagement of main latch 177. Thus, an auxiliary lever 213, having an end 214 in the form of a pawl, is pivoted to a bracket 215 carried by rail 133, and the two levers are interconnected by a tension spring 216. An arm 217 pivoted on arm 178 at 218 near the latch 177 has a lower, forked end 219 engaging a pin 221 carried by lever 213. The arrangement is such that when latch 177 is engaged behind a shoulder 174 or 176, the forked end 219 urges lever 213 downward so that its end pawl 214 is clear of the shoulders 174, 176, the parts being held in this position by spring 180.

The points of pawls 177 and 214 are not diametrically opposed, as are the shoulders of disc 164, but are slightly offset from this position. Due to this arrangement, when pawl 177 is engaged with one shoulder of disc 164, the other shoulder thereof has passed beyond pawl 214. When pawl 177 is lifted out of engagement with a shoulder, say 174, by wire 206, spring 216 carries lower pawl 214 into contact with the disc and rotation of the latter is stopped when the shoulder 174 contacts pawl 214. At this phase the opposite shoulder 176 has not yet come abreast of upper pawl 177. After pin 212 passes shoulder 209 of lever 207, pawl 177 is lowered by spring 180 and falls in front of the uppermost shoulder 176 on disc 164 prior to release of the disc by the consequent motion downward of the lower pawl 214. Thereafter, disc 164 rotates a slight amount into contact with pawl 177 and is held motionless thereby during the subsequent cutting operation.

A modified form of cutting drum is shown in Figs. 12 to 14. In this form the cutting blades are also arranged in helical configuration, but are mounted for axially sliding adjustment on the periphery of a drum-shaped element 222. The latter may comprise separate sections, one of which is shown in Fig. 12, each having a hub 223, a circular web 224 and a peripheral flange 225, the latter being of a width to accommodate one convolution of the helix. Preferably, the drum is constructed of aluminum. The cutting-blade holders comprise L-shaped elements having bases 226 with elongated slots 227 accommodating screws 228, which secure the bases in slots 229 milled in the periphery of the drum and arranged parallel to the drum axis. The holders are adjustable in position along slots 229 by virtue of the slots 227. The cutting blades 39 are clamped to radially extending arms 231 of the holders, and for this purpose, such arms have a recessed portion 230 to accommodate the blade, the latter being clamped by means of a strap 233 secured by bolts 234 to arm 231. The strap has reduced end portions providing a thicker central portion 236 adapted to fit in recess 230, which guarantees contact of the strap with the blade.

Aside from increased sturdiness of construction, and ease of manufacture, the modified drum provides an important improvement in the adjustability of the blades. During use, the blades frequently need adjustment axially of the drum. With the "finger" type of cutting drum this had to be done by shimming, using cut and try methods. This meant repeated bolting and unbolting of the various blades, requiring adjustment. With the slide arrangement, the trial adjustments are very easily and quickly made by tapping the holders. With the high rate of production obtained by these helical cutting machines, the difference in time involved in the two modes of adjusting is not as trivial as it might seem. With the two types of drums operating at the same time, the differences have been apparent and are highly favorable to the sliding type of blade holder.

In Fig. 11 is shown a device for limiting rebound of the mandrel when it rolls into cutting position. This is necessitated by the fact that the automatic controls are set to minimize lost time, and cutting is commenced within a minimum time interval after the mandrel has rolled into position.

The parts are mounted on a pair of plates 237, one at each side of the ramp, which are each secured by bolts 238 to a pair of upstanding fingers 239 on rails 132, 133 of the ramp, the fingers being provided with long slots 241 whereby the position of plates 237 is adjustable vertically to take care of various sizes of work pieces. Since the parts are the same on the two sides of the ramp, only one set need be described. Plate 237 has an upstanding finger 242 to which is pivoted, at 243, an arm 244 having a sloping edge 246 which yields to a rolling work piece 108, whereby arm 244 turns clockwise about pivot 243; and arm 244 also has a substantially straight and generally vertical edge 247 which limits rebound of the work piece after arm 244 has fallen behind the latter.

The locking position of arm 244 is rendered more positive by means of a latch 248 pivoted to the arm at 249, and having a shoulder 251 engageable beneath a lug 252 on finger 242 to prevent clockwise turning of arm 244. The work piece released from lug 152 for delivery to the cutting drum first contacts a curved edge 253 of latch 248 to unlock the same, and maintains contact with the latch until arm 244 has swung sufficiently that shoulder 251, when released, will not engage under lug 252. However, when arm 244 drops, the latch immediately engages to lock the arm.

While certain preferred embodiments of the invention have been shown and described, the same is not to be deemed as limited thereby, since various changes and modifications, which do not, however, depart from the scope of the invention, will suggest themselves to those skilled in the art in the light of the present disclosure.

What is claimed is:

1. For use with a power driven mandrel carrying material to be cut into a plurality of units, a generally drum-shaped cutter assembly comprising a shaft mounted for rotation and having disposed thereon a plurality of plate-type radially extending elements in circumferentially overlapping engagement, with a portion of each element in contiguous overlapping engagement with a portion of an adjacent element adjacent said shaft to define helical convolutions about said shaft, means maintaining said elements in clamped assembly for rotation with said shaft, and a cutter blade attached to the outer terminus of each of said radially disposed elements whereby the axially spaced cutting edges of the blades intersect and cut the cuttable material mounted on said mandrel upon rotation of said assembly.

2. A device of the character described having in combination, an elongated supporting structure adapted to be supported horizontally in respect to a supporting base, said supporting structure including a pair of elongate members maintained in spaced relation to define a chamber therebetween, a drum-type cutter element provided with helically disposed blades rotatably supported by said supporting structure, means aligned with said supporting structure in the vertically projected area thereof for the reception and rotational support of a work carrying mandrel, a power unit disposed at one end of said supporting structure, means connecting said power unit to said mandrel supporting means and to said cutter element, said last-mentioned means including reduction gearing disposed at the end of said supporting structure adjacent said power unit, a power transmitting shaft extending to the opposite end of said supporting structure, and means associated with said shaft at said opposite end and said cutter element for further speed reduction to said cutter element, means for feeding unprocessed work mandrels to said mandrel supporting means, and means for the discharge of processed work mandrels therefrom, said feeding and discharge means cooperatively associating with said cutter element drive means to effect timing thereof in respect to the relative rotation of said cutter element.

3. In a device of the character described, the combination with a drum-like cutter assembly mounted for rotation, said assembly including a plurality of cutter blades mounted for rotation in planes normal to the axis of rotation and equally spaced along said axis, said blades defining a generally helical configuration, but being omitted in a relatively short path peripherally of said drum-like assembly, means for feeding a mandrel to a position in axial parallelism with and adjacent to the cutter assembly and in registry with the portion devoid of teeth, centering and driving means for engaging and rotating said mandrel in said position, means for rotating said cutter assembly, means for stopping the rotation of said cutter assembly upon one complete revolution thereof, means for the retraction of said centering and driving means upon completion of one revolution of said cutter elements, means for the discharge of said mandrel, and means operatively associated with said discharge means to effect feeding of a second mandrel to said first mentioned position adjacent the cutter element.

4. The device of claim 3 wherein said first mentioned and said second mentioned mandrels are fed and discharged by gravity and means operatively associated with said cutter assembly for restraining said mandrels from being fed to said cutter and discharged therefrom until said cutter reaches a predetermined circumferential position.

5. A cutter mechanism including in combination, a rotatably mounted cutter assembly, an elongated rack for the gravity feed of mandrels to a position adjacent said cutter assembly, said rack including an inclined plane allowing said mandrels to roll to a position of abutment with said cutter assembly, stop means spaced from said assembly operable between a mandrel engaging position restraining said mandrels from rolling to said abutting position and a mandrel releasing position, said stop means adapted to be actuated between said positions by the weight of said mandrels, and lock means associated with said stop means and operable in response to the rotation of said cutter assembly to prevent actuation of said stop means between said above-mentioned positions except during preselected angular positions of said cutter.

6. A device as in claim 5 in which said stop means comprises an element pivotally mounted below said inclined plane and spaced from said cutter assembly, said element provided with lugs spaced longitudinally of said plane.

7. The device of claim 5 including an element pivotally mounted intermediate the lower end of said cutter assembly and said inclined plane and upon which said mandrels are fed to be supported thereby, means for locking said element against pivotal movement in respect to said inclined plane, and means associated with said rotatably mounted cutter assembly and operable at a preselected angular position of said assembly for the release of said lock means whereby to permit rotation of said pivotally mounted member under the weight of a supported mandrel for gravity discharge thereof.

8. A device of the character described having in subcombination a pair of elongated angle members, means maintaining said members in parallel spaced relation with aligned surfaces thereof defining inclined planes, an element pivotally associated with said members to extend transversely thereof, a pair of stop members fixed to said element to pivot therewith, said stop members including upstanding arm portions spaced longitudinally of said members and adapted to alternate upon pivoting of said element between positions above and below the common plane of said angle members, means associated with said pivotal members for the releasable locking thereof against pivotal movement, said last-mentioned means including a lever, pivoted in an intermediate portion thereof and provided at one end with a portion engageable with said pivoted member and at the opposite end with means biasing said lever toward an engaged position, and release means operable in opposition to said biasing means for the release of said locking means.

9. A device of the character described, comprising a driven cutter assembly including helically and axially disposed cutting blades mounted for rotation to define circles of equal diameter, and means for mounting a mandrel in axial parallelism with said cutter assembly for the rotation of work on the mandrel in the path of said blades, the combination of means for selectively feeding said mandrels to said mandrel mounting means and for the discharge of mandrels therefrom, timing means cooperatively connected between said selective feeding means and said cutter assembly for the actuation of said selective feeding and said discharge means at predetermined angular positions of said cutter assembly during the rotation thereof, means for rotating said mandrel, and power transmission means intermediate said mandrel rotating means and said cutter assembly for the rotation of said cutter assembly, said transmission means including a clutch automatically operable at a preselected position of said cutter means for the disengagement of said transmission means and automatically responsive to continued rotation of said transmission means for subsequent engagement and rotation of said cutter assembly.

10. A cutting device having in combination a drum-type cutter mounted on a shaft for rotation therewith and provided with multiple cutter plates spaced circumferentially and axially thereof, said plates defining a helical pattern and being omitted longitudinally of the cutter through a limited circumferential distance thereof, means positioned parallel to the axis of rotation of said cutter for centering and driving a mandrel in close proximity to paths defined by said cutter plates, means for storing a plurality of mandrels having unprocessed work disposed thereon, means for individually releasing and feeding mandrels to said centering and driving means, means associated with said centering and driving means for engaging and lifting said mandrel free of said feed means during rotation thereof, power transmission means associated with said mandrel driving means for the rotation of said cutter including a positively engaging clutch, said clutch operatively responsive to angular positions of said cutter to disconnect said cutter from said transmission means once during each revolution of said cutter and means to reconnect said cutter after a predetermined time interval.

11. In a device of the character described, the subcombination comprising a rotatably mounted cutter, a cam carried thereby, drive means for rotating said cutter, a clutch assembly interposed between said cutter and said drive means, a cam carried by said drive means, and a cam follower operatively associated with said clutch assembly for actuation between a clutch engaging and a clutch disengaging position, said cam follower being responsive to said cam carried by said cutter to disengage said clutch assembly, and responsive to said cam carried by said drive means to engage said clutch assembly.

12. In a device of the character described, the combination with a power driven work-receiving mandrel of a generally drum-shaped cutter assembly fixed against movement, and comprising a shaft mounted for rotation in parallel spaced relation to said mandrel and having fixed thereto a plurality of cutter blades disposed in circumferentially and axially spaced relation in the general configuration of a helix, said blades being positioned for cutting action in planes normal to the axis of rotation of said shaft and disposed radially thereof at equal distances for engagement with work mounted upon said mandrel, said helically disposed blades extending axially along the rotatively mounted shaft to which they are fixed a distance substantially equal to the length of said mandrel, and means to rotate said shaft in the same direction as said mandrel.

13. A cutter mechanism for forming annular objects from tubular, resilient material, comprising a shaft fixed against axial movement and mounting a series of cutting blades with outer cutting edges defining a helical path, means for rotatably mounting a mandrel adjacent to and in parallelism with said shaft, drive means to rotate said mandrel, means to rotate said shaft in the same direction as said mandrel but at a considerably lower speed than said mandrel, and in synchronism therewith, and means responsive to a predetermined degree of rotation of said shaft to stop the said shaft temporarily during continued rotation of said mandrel driving means.

14. A cutter mechanism for forming annular objects from tubular, resilient material, comprising a shaft mounting a series of cutting blades with outer cutting edges defining a helical path, means for rotatably mounting a mandrel adjacent to and in parallelism with said shaft, drive means to rotate said mandrel, means to rotate said shaft in the same direction as said mandrel but at a considerably lower speed than said mandrel, and in synchronism therewith, timer means associated with the drive means for said mandrel, release means for said mandrel mounting means controlled by said timer means, a clutch associated with said shaft, means responsive to a predetermined degree of rotation of said shaft to disengage said clutch, and means responsive to continued rotation of said mandrel mounting means after disengagement of said clutch, to re-engage said clutch.

15. A cutter mechanism for forming annular objects from tubular, resilient material, comprising a shaft mounting a series of cutting blades with outer cutting edges defining a helical path, disengageable means for rotatably mounting a mandrel adjacent to and in parallelism with said shaft, control means responsive to a predetermined number of rotations of said mandrel mounting means to disengage the latter from a mandrel, temporary holding means for said mandrel when disengaged, a ramp for feeding mandrels by gravity to cutting position, detent means for retaining mandrels on said ramp, and release means for said detent means, said release means responsive to disengagement of mandrels from said mounting means and comprising a first escapement having a first lever movable by said timer, and a second escapement actuable in response to movement of said lever, said second escapement comprising a disc with diametrically opposite ratchet teeth, a second lever operatively connected to said temporary holding means to release the same, said second lever having a pawl engageable successively with said ratchet teeth, a third lever resiliently connected to said second lever and having a pawl spaced less than 180° from the pawl of said second lever, and means responsive to inactivation of said temporary holding means to withdraw said detent.

16. In a machine having a mandrel holding and release mechanism, an escapement associated with said release mechanism comprising a disc having diametrically opposed ratchet teeth, a first lever having a pawl successively engageable with said ratchet teeth, a second lever having a pawl engageable on the periphery of said disc at a point located less than 180° from the point of engagement of the pawl of said first lever on said periphery, reckoned on that portion of said periphery outward of the distal ends of said levers, a third lever pivoted to said first lever and contacting said second lever whereby said second lever is pushed by said first lever away from said periphery, spring means urging the pawl of said first lever into contact with said disc, tension spring means connecting said first and second levers, and means to move said first lever to disengage its pawl from said disc.

References Cited in the file of this patent

UNITED STATES PATENTS

| Number | Name | Date |
|---|---|---|
| 21,782 | Sperry | Oct. 12, 1859 |
| 41,459 | Worden | Feb. 2, 1864 |
| 179,401 | Coogan | July 4, 1876 |
| 335,309 | Rendall | Feb. 2, 1886 |
| 763,558 | Harthan | June 28, 1904 |
| 1,348,316 | Perrault | Aug. 3, 1920 |